May 29, 1934. E. K. BENEDEK 1,961,029
SELF COOLING HIGH PRESSURE LUBRICANT FILM BEARING
Filed Aug. 18, 1931
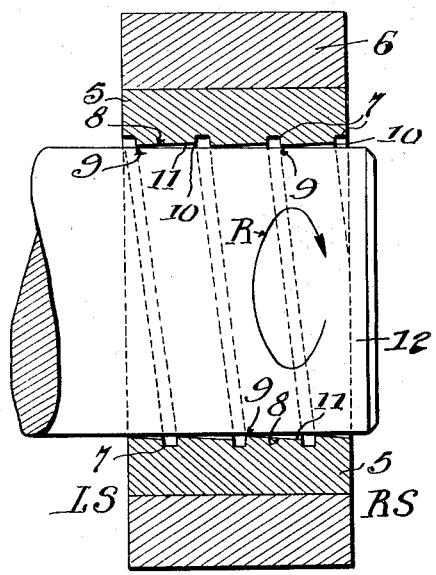
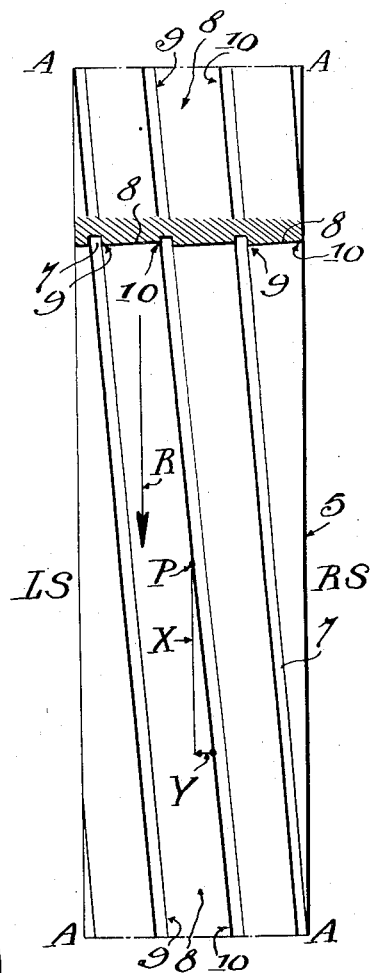
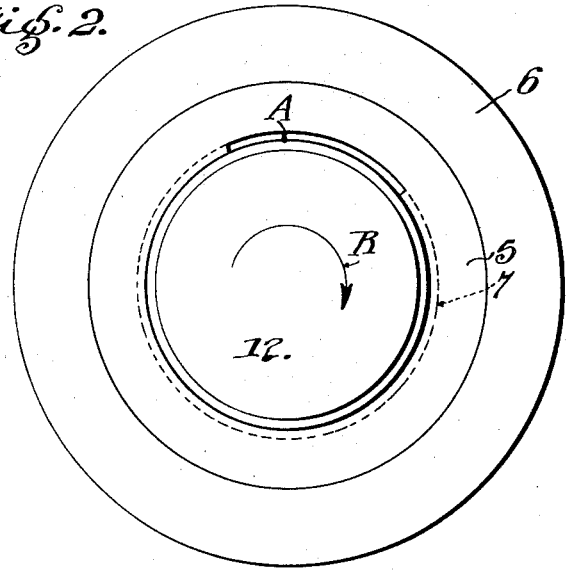
INVENTOR
E. K. BENEDEK
BY Baldwin & Wight
ATTORNEYS Patented May 29, 1934

1,961,029

UNITED STATES PATENT OFFICE 1,961,029

SELF-COOLING HIGH PRESSURE LUBRICANT FILM BEARING

Elek K. Benedek, Mount Gilead, Ohio

Application August 18, 1931, Serial No. 557,888

5 Claims. (Cl. 308—121)

This invention relates generally to means for lubricating bearing surfaces of machinery and primarily has for an object to provide a novel shaft bearing in which spiral groove and tapered intervening field equipments are employed and so cooperatively arranged as to utilize centrifugal force to draw the lubricant through the bearing and for building up high pressure lubricant film in the bearing, thus assuring self cooling of the bearing and a relatively high speed and high load carrying capacity.

In ordinary journal bearings the lubricant particles are moved in a plane perpendicular to the axis of the rotating shaft. In such cases, the lubricant particles are rotating always in the same plane and if the bearing is a little too tight, the particles have no chance to get away from the heavy load and thus they become very hot and the lubricant film breaks down. Quite frequently there is a perfect lubricant bath at hand where a journal bearing is required which can be readily utilized to lubricate the bearing, and in these instances it is advantageous to use a lubricant film bearing since it has much higher bearing capacity than any bearing of the roller or ball type, and much less friction coefficient than ordinary journal bearings.

In its more detailed nature the invention resides in the provision of a novel form of lubricant film bearing in which is provided a helical grooveway extending around in and passing through the bearing and through which the lubricant is forcibly drawn by centrifugal force, the fields of the bearing surfaces between the spaced groove portions being flared outwardly in the direction of axial progression of the lubricant in order to provide helical wedge channels into which the lubricant is forced to form a high pressure lubricant film which is being changed constantly, thus assuring efficient lubrication and providing for suitable cooling of the bearing.

Other objects will in part be obvious and in part pointed out hereinafter.

To the attainment of the aforesaid objects and ends, the invention further resides in the novel details of construction, combination and arrangement of parts, all of which will be first fully described in the following detailed description, then be particularly pointed out in the appended claims, reference being had to the accompanying drawing, in which:

Figure 1 is a longitudinal section of a bearing embodying my invention.

Figure 2 is an end elevation of the parts shown in Figure 1.

Figure 3 is a development of the inside bearing face of my improved bearing.

In the drawing, 5 designates a bearing bushing or sleeve which is pressed into or otherwise secured in the bore of the bearing proper designated 6.

The internal or bearing face of the bushing 5 is provided with a helical lubricant groove-way 7 which preferably extends through the whole length of the bearing and is either round or square cut as may be desired. The faces of the bearing fields intervening the groove portions are flared outwardly in the direction of progression of lubricant through the grooveway as indicated at 8, thus providing restricted bearing portions 9 and spaced or relieved portions 10 and forming a helical wedge shaped channel 11 having its widest dimension adjacent the trailing edge of the grooveway and the most restricted portion thereof adjacent the advance edge of the grooveway.

In Figure 3 of the drawing, I have shown a development of the bearing surface of the bushing 5, the lines A—A corresponding to the designation A in Figure 2 and indicating the meeting ends of the developed bushing. In Figures 3 and 1, LS designates the left side of the bearing and RS, the right side thereof, toward which the lubricant is forcibly fed by centrifugal force and the helical channel 11 and grooveway 7 provided therefor. The bearing should be considered as immersed in a lubricant bath (not shown) and the shaft 12 as rotating in the bearing in the direction indicated by the arrows R. In an ordinary cylindrical flat surface bearing the rotating shaft would tend to carry lubricant particles indicated at P with it in the plane of its rotation or perpendicular to the axis of rotation as indicated by the line X. It should be evident by reference to Figures 1 and 3 of the drawing, however, that in my improved bearing, by reason of the provision of the tapered faced helical channel, the particles P will be caused to travel along a line parallel the groove line indicated at 7. In other words, while in ordinary cylindrical flat surface bearings the lubricant particles are wiped along in the same meridian, in my improved wedge shaped channel an axial shift or movement indicated at Y is occasioned and in this manner the lubricant is forced along the bearing toward the end of the shaft. Furthermore, during this movement of the lubricant it is forced deep into the constriction of the channel wedge forming a highly efficient high pressure film.

By thus providing for axial displacement of the lubricant by forcing it against helically disposed slanting surfaces, positive resistance is set up which assures maintenance of a constant high pressure lubricant film throughout the length of the bearing.

In ordinary plain bearings, the bearing length must be of considerable magnitude in order to maintain in a central zone of the bearing the required film pressure. In accordance with the present invention, the helical grooveway 7 preferably is of such pitch as to include a plurality of connected turns between the ends of the bearing, thereby increasing the length of the path of oil flow from one end of the bearing to the other and consequently enabling the building up of a substantially continuous high pressure oil film along the entire bearing length. Since my bearing construction provides the desired high pressure film throughout the whole length of the bearing surface, it is possible to employ a bearing of minimum size and yet obtain the maximum efficiency possible than in much longer bearings of other forms.

Furthermore, in ordinary flat surface bearings the running clearance has to be maintained at a certain amount in order to avoid seizure of the bearing, whereas in my improved bearing a much smaller clearance is sufficient due to the provision of an efficient high pressure lubricant film throughout the whole length of the bearing.

From the foregoing description, taken in connection with the accompanying drawing, it is thought that the novel details of construction, the manner of use and the advantages of my invention will be readily apparent to those skilled in the art to which it relates.

I claim as my invention:

1. In a bearing, a shaft element and a sleeve element one rotatably supported by the other, one said element having formed in the bearing face thereof a continuous helical grooveway including a plurality of turns between the ends of the bearing, the fields between spaced portions of the grooveway being shaped to provide in combination with the opposed bearing face of the other element a helical channel wedge shaped in cross section for the purpose specified.

2. In a bearing, a bearing sleeve having a bearing bore therein, a shaft rotatable in the bore, the bearing face of the bore being provided with a helical groove extending from end to end of the sleeve and completely around the latter whereby when the bearing bore is immersed in a lubricant bath rotation of the shaft will cause lubricant to flow through the groove, the fields intervening spaced portions of the groove being flared outwardly in the direction of progression of lubricant through the groove so as to form in combination with the opposed face of the shaft a helical channel wedge shaped in cross section into the restricted portions of which lubricant is forced by rotation of the shaft to form high pressure film.

3. In a bearing, a shaft element and a sleeve element one rotatably supported by the other, one said element having formed in the bearing face thereof a helical grooveway extending the full length of the sleeve and completely around the latter whereby when the bearing bore is immersed in a lubricant bath rotation of the rotatable element will cause lubricant to flow completely around and along the bearing, the fields intervening spaced portions of the grooveway being inclined with respect to the axis of the bearing to provide in combination with the opposed bearing surfaces a helical channel wedge shaped in cross section into the constricted portion of which the lubricant is forced by rotation of the rotatable element thereby building up a high pressure film bearing.

4. In a bearing, a shaft element and a sleeve element one rotatably supported by the other, one said element having formed in the bearing face thereof a helical grooveway extending along and completely around said element and having the wall thereof which opposes in bearing relation the bearing surface of the other element inclined with respect to the opposed bearing surface of said other element whereby to form a helical wedge shaped lubricant film passageway in which a continuous helical pressure lubricant film is built up varying in pressure as the speed of rotation of the rotatable element varies.

5. In a bearing, a shaft element and a sleeve element, one rotatably supported by the other, one said element having formed in the bearing face thereof a helical grooveway including a plurality of turns, the fields between adjacent turns being uninterruptedly inclined relative to the bearing axis from the advance edge of one turn to the rear edge of the next adjacent turn whereby to provide in combination with the other bearing element a helical channel, wedge-shaped in cross section, into which lubricant is forced by rotation of the rotatable element, thereby building up a substantially continuous high pressure oil film for supporting said rotatable element along its entire length.

ELEK K. BENEDEK.

CERTIFICATE OF CORRECTION.

Patent No. 1,961,029.                                           May 29, 1934.

ELEK K. BENEDEK.

It is hereby certified that the above numbered patent was erroneously issued to the inventor said "Benedek" whereas said patent should have been issued to The Hydraulic Press Manufacturing Company, of Mount Gilead, Ohio, as assignee of the entire interest in said invention, as shown by the records of assignments in this office; and that the said Letters Patent should be read with this correction therein that the same may conform to the record of the case in the Patent Office.

Signed and sealed this 10th day of March, A. D. 1936.

Leslie Frazer (Seal)                                          Acting Commissioner of Patents.